United States Patent [19]
Lee

[11] Patent Number: 6,147,797
[45] Date of Patent: Nov. 14, 2000

[54] IMAGE PROCESSING SYSTEM FOR USE WITH A MICROSCOPE EMPLOYING A DIGITAL CAMERA

[75] Inventor: In-Gu Lee, Namyangju, Rep. of Korea

[73] Assignee: KI Technology Co., Ltd., Seoul, Rep. of Korea

[21] Appl. No.: 09/231,838

[22] Filed: Jan. 15, 1999

[30] Foreign Application Priority Data

| Jan. 20, 1998 | [KR] | Rep. of Korea | 98-01584 |
| Aug. 21, 1998 | [KR] | Rep. of Korea | 98-34076 |
| Oct. 16, 1998 | [KR] | Rep. of Korea | 98-19863 |
| Dec. 21, 1998 | [KR] | Rep. of Korea | 98-56876 |

[51] Int. Cl.$^7$ ............................. G02B 21/36; G02B 21/00
[52] U.S. Cl. ............................. 359/363; 359/368; 348/79
[58] Field of Search ................... 359/363, 368, 359/369, 367, 642, 808–812; 348/73, 75, 79; 396/432–433

[56] References Cited

U.S. PATENT DOCUMENTS

| 2,209,532 | 7/1940 | Michel | 359/363 |
| 3,106,129 | 10/1963 | Frenk et al. | 359/363 |
| 3,721,170 | 3/1973 | Johnson | 359/363 |
| 5,327,231 | 7/1994 | Krummey et al. | 348/79 |
| 5,396,068 | 3/1995 | Bethea | 250/330 |
| 5,497,267 | 3/1996 | Ishikawa et al. | 359/363 |
| 5,523,583 | 6/1996 | Choate | 359/363 |

*Primary Examiner*—Thong Nguyen
*Attorney, Agent, or Firm*—Rabin & Champagne, PC

[57] ABSTRACT

An image processing system is provided with a frame on which the digital camera is seated, a fixing device for connecting the frame to a connector of the microscope, a magnifying lens arranged within the fixing device for magnifying an image enlarged by objectives within a tube of the microscope, a spherical aberration correcting lens arranged within the fixing device for correcting a spherical aberration caused by a lens contained in the digital camera, and a chromatic aberration correcting lens arranged within the fixing device for correcting a chromatic aberration.

2 Claims, 15 Drawing Sheets

IMAGE PROCESSING SYSTEM FOR USE WITH A MICROSCOPE EMPLOYING A DIGITAL CAMERA

FIELD OF THE INVENTION

The present invention relates to an image processing system for use with a microscope employing a digital camera; and, more particularly, to an image processing system for use with a microscope wherein an enlarged image of a specimen seen through the microscope is taken by a digital camera to be processed in various different manners that, e.g., the image data of the sample is edited by using a computer system or is recorded in a cassette tape for a video cassette recorder(VCR) or is sent to a monitor or a projector to be seen by a plurality of persons at the same time.

DESCRIPTION OF THE PRIOR ART

In general, a microscope through which a minute object is enlarged by means of a lens or lens system is widely used to study natural science, especially, biophysics, medical science and material engineering, etc., or to examine a semiconductor device or the like. Further, the microscope is used by a plurality of students during an education program, e.g., biological practice.

There is shown in FIG. 1 a conventional image processing system for use with a microscope using an analog camera 70. In the microscope 5, a specimen is observed in such a manner that it is first positioned on a slide glass 20 on a stage 10 and then eyepieces 40 and objectives 30 are translated to focus onto the specimen depending upon a selected magnification. In order to record the image of the specimen, an adapter 60 is first installed onto a connector 50 on an upper portion of the microscope 5 and then the analog camera 70 is combined into the adapter 60 with its lenses being removed therefrom and, finally, the image of the sample is taken by the analog camera 70.

While the prior art image processing system mentioned above is capable of performing its assigned task, it has several shortcomings. First of all, a moving picture of a live creature sample cannot be obtained from the conventional image processing system, since the system uses the analog camera.

Further, in order to allow the picture of the sample taken by the analog camera to be processed by a computer system, the picture has to be additionally processed by a scanner or a CCD camera and A/D converter. Especially, a picture information digitalized by using the CCD camera and the A/D converter, has a degraded quality into a half level of the original picture.

Even if a digital camera is employed in the image processing system, there exists a problem. That is, if a digital camera constructed not to permit a removal of its lenses is used in the image processing system, the digital camera cannot obtain a distinct and clear picture due to a spherical aberration and a chromatic aberration by the lenses of the digital camera.

In addition, the conventional image processing system does not have a full compatibility with respect to various kinds of microscopes and cameras, since the adapter is designed to accommodate only a particular type of microscope and camera. Accordingly, if the particular type of microscope and camera are selected, an adapter capable of accommodating the selected microscope and camera has to be used in the conventional image processing system.

SUMMARY OF THE INVENTION

It is, therefore, a primary object of the invention to provide an image processing system for use with a microscope using a digital camera in which an enlarged image of a specimen seen through the microscope is taken by the digital camera to be processed in various different manners that, e.g., the image data of the sample is edited by using a computer system or is recorded in a cassette tape for a video cassette recorder(VCR) or is sent to a monitor or a projector to be seen by a plurality of persons at the same time.

Another object of the present invention is to provide an image processing system for use with a microscope using a digital camera including an adapter capable of accommodating a digital camera designed not to permit a removal of its lenses and provided with a magnification lens, a spherical aberration correcting lens and a chromatic aberration correcting lens in order to prevent the spherical and the chromatic aberrations.

Another object of the present invention is to provide an image processing system for use with a microscope using a digital camera wherein the digital camera equipped with a connector on a lower portion thereof is combined with the microscope through the use of an adapter, a movable ring, a first cylinder and a second cylinder which enable different types of digital cameras in size and shape to be easily combined/detached with/from the microscope.

Another object of the present invention is to provide an image processing system for use with a microscope using a digital camera wherein the digital camera can be combined with the microscope through the use of a movable fixing device for depressing a connecting portion of the microscope, the movable fixing device moving linearly in a radial direction in response to a rotational movement of a movable ring, allowing different types of microscopes in size and shape to be easily combined with the digital camera.

In accordance with the present invention, there is provided an image processing system is provided with a frame on which the digital camera is seated, a fixing device for connecting said frame to a connector of the microscope, a magnifying lens arranged within the fixing device for magnifying an image enlarged by objectives within a tube of the microscope, a spherical aberration correcting lens arranged within the fixing device for correcting a spherical aberration caused by a lens contained in the digital camera, and a chromatic aberration correcting lens arranged within the fixing device for correcting a chromatic aberration.

According to one aspect of the present invention, there is provided with an image processing system for use with a microscope employing a digital camera, the system comprising: an adapter having a magnifying lens fixed inside an upper portion of the adapter, being aligned with lens of the digital camera and a female thread formed on a lower portion of the adapter, and a first handle provided with a plurality of grooves each of which has a second contact surface, the adapter provided with a first protuberance protruding from an external surface of a middle portion of the adapter; a connecting body connected to the female thread of the adapter and having a disk provided with a plurality of guiding cuts which are radially arranged, a plurality of guiding rails formed on lateral walls of the guiding cuts, and a hollow contact area with a second male thread; a lower movable ring of a ring shape coming into contact with an upper surface of the disk and having a first adjust thread formed on its lower surface; and a plurality of sliders sliding in a radial direction of the disk along the guiding rail formed on the connecting body in response to a rotation of the lower movable ring and having a second adjust thread on its upper surface which is engaged with the first adjust thread and a guiding groove, on its lateral surface, into which the guiding rail is engaged.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
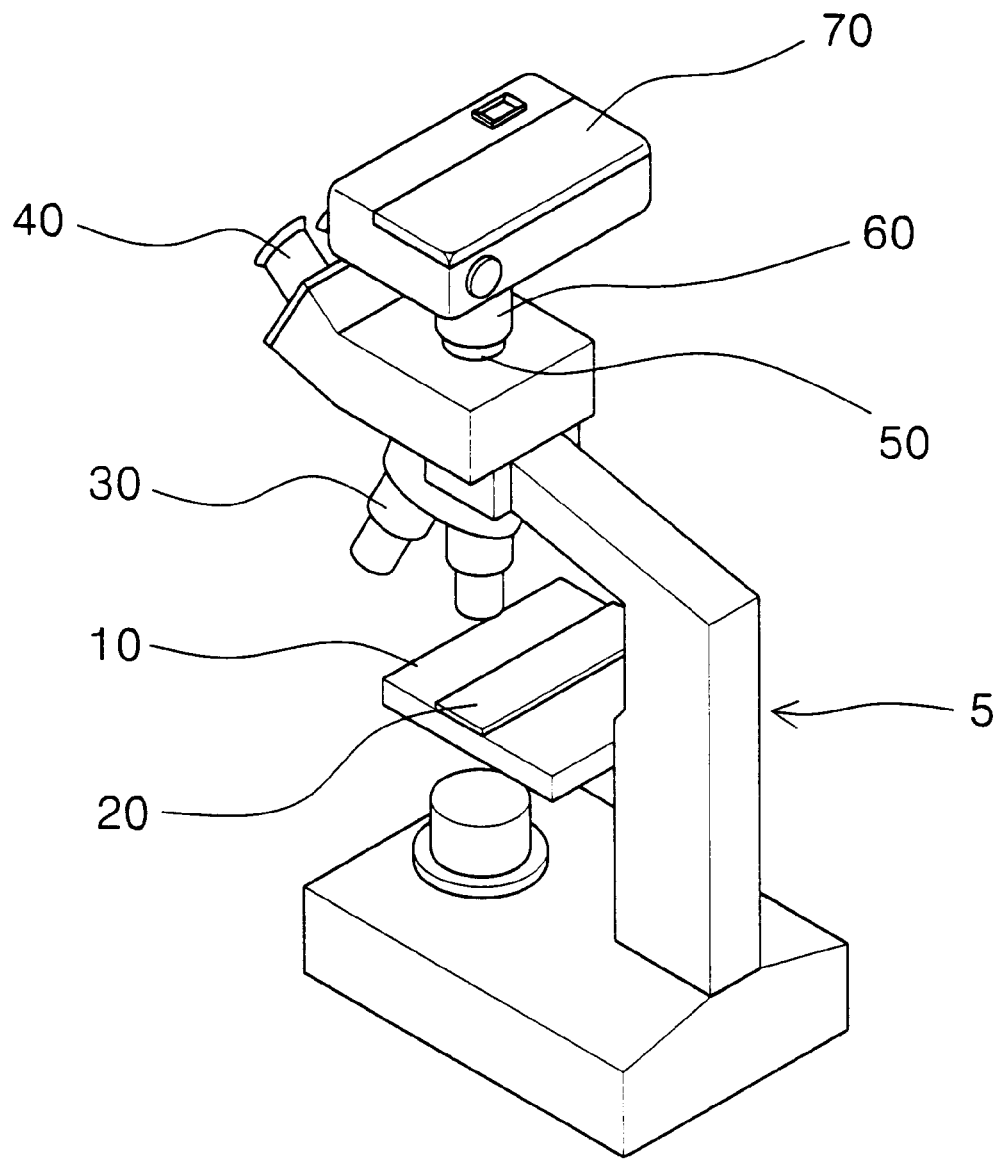
FIG. 1 shows a perspective view of an image processing system using an analog camera for use with a microscope.
Figure 2:
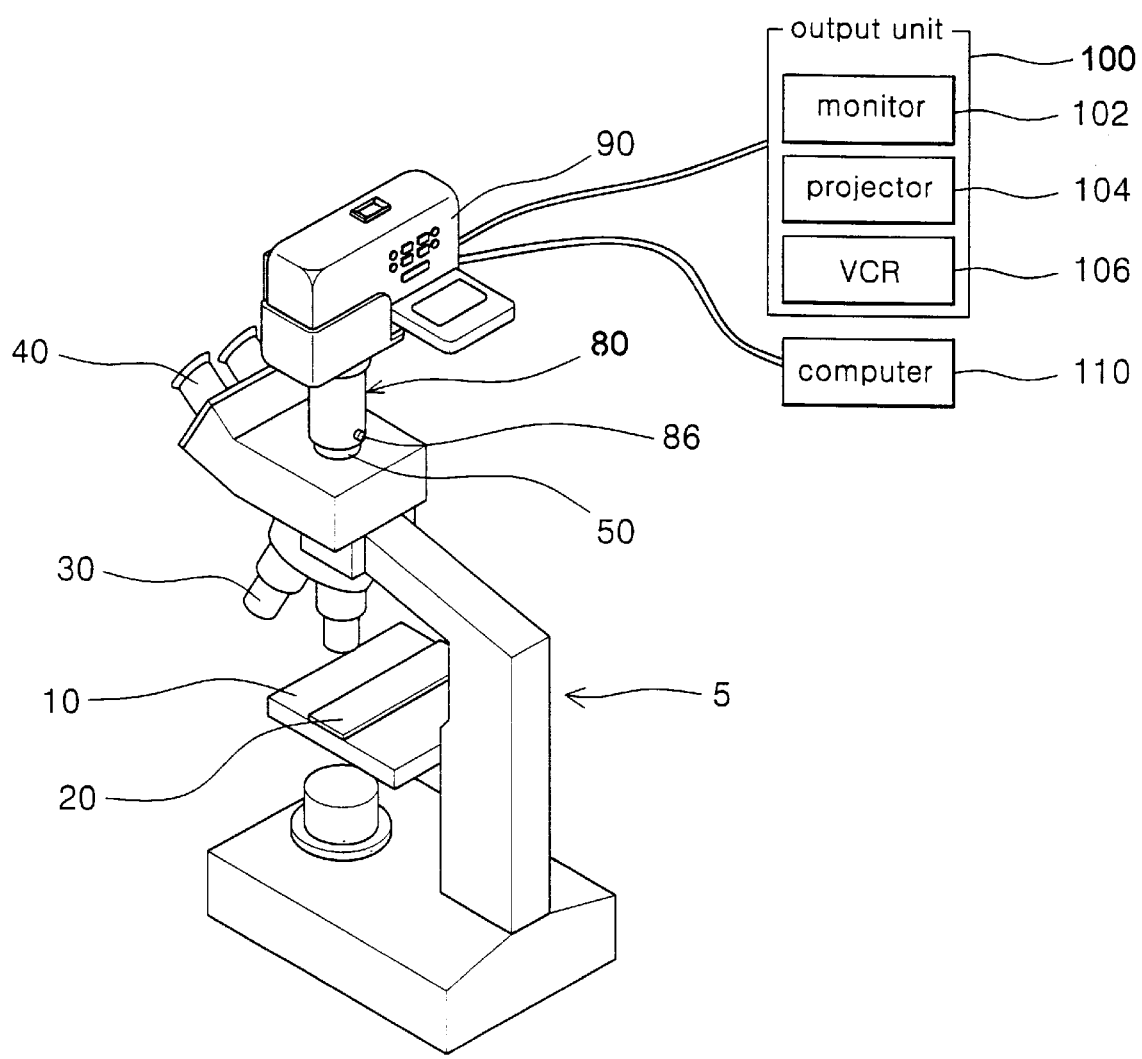
FIG. 2 shows a perspective view of an inventive image processing system using a digital camera for use with a microscope.

Referring to FIG. 2, there is shown a perspective view of the inventive image processing system for use with a microscope employing a digital camera.

As shown, in the microscope 5, a specimen is observed in such a manner that it is first positioned on a slide glass 20 on a stage 10 and then eyepieces 40 and objectives 30 are translated to focus onto the specimen depending upon a selected magnification.

For the processing of the image of the specimen, an adapter 80 is first installed onto a connector 50 on an upper portion of the microscope 5 and then a digital camera 90 is combined into the adapter 80 and the image of the sample is taken by the digital camera 90 to be stored as digitalized image data. During a generation of the digitalized image data, audio data of voice for a note can be made, so that both image and audio data can be concurrently processed.

The image data taken by the digital camera 90 is outputted to an output device 100 connected to an output terminal of the digital camera 90. The output device 100 includes a monitor 102 for displaying the image data outputted from the digital camera 90, a projector 104 for projecting the image data from the digital camera 90 on a screen(not shown) and a video cassette recorder 106 for recording the image data from the digital camera 90. That is, the output device 100 enables the image of the specimen in a moving or a static picture to be seen by a plurality of persons at the same time. Further, the output device 100 enables the image of the specimen to be recorded in a magnetic media, thereby allowing a repeated observation of the image.

The image data from the digital camera 90 is inputted to a computer system 110 to be edited and analyzed and restored in the same 110. In this operation, the image data on a memory card positioned within the digital camera 90 may be read by the computer system 110 to be edited. The edited image data together with the audio data in the computer system 110 is reversely transmitted to the digital camera 90.

Figure 4:
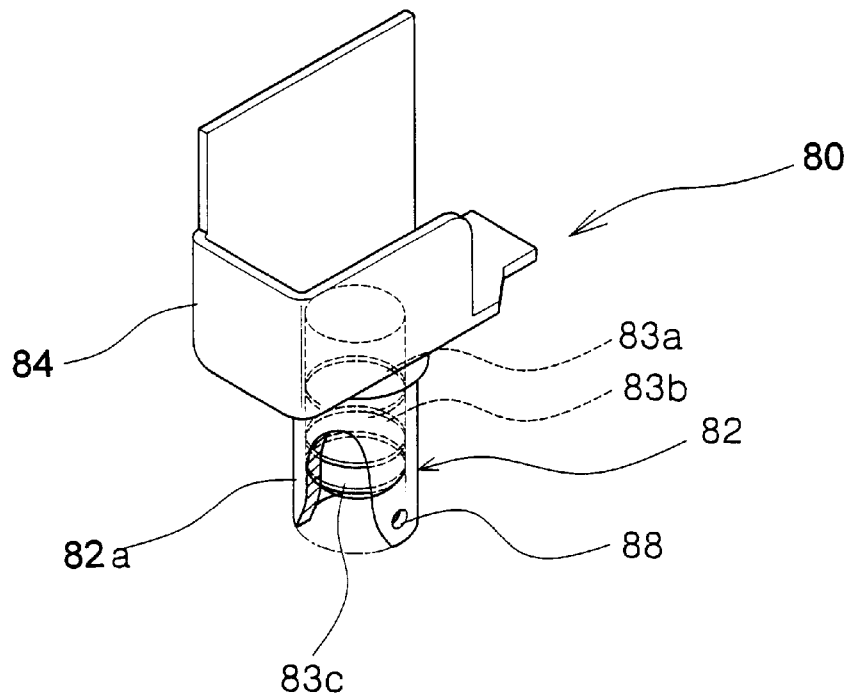
FIG. 4 shows a perspective view of an adapter employed in the inventive image processing system for use with a microscope in accordance with a first embodiment of the present invention.

Referring to FIG. 4, there is shown a perspective view of the adapter 80 employed in the inventive image processing system employing the digital camera for use with the microscope.

As shown, an adjusting portion 82 of a cylindrical shape is provided with a magnifying lens 83a for magnifying the image enlarged by the objectives 30, a spherical aberration correcting lens 83b for correcting the spherical aberration caused by lens contained in the digital camera 90 and a chromatic aberration correcting lens 83c for correcting the chromatic aberration due to a prism effect of a light. All of the lenses within the adjusting portion 82 are of a widen view lens in order to cover a wide view angle of the digital camera 90 and to provide the user with a wider view.

Further, a fixing through hole 88 is formed through the adjusting portion 82. The connector 50 on the upper portion of the microscope 5 is fixed to the adjusting portion 82 by driving a screw(not shown) into the fixing through hole 88.

A camera mounting structure (frame) 84 is formed on an upper portion of the adjusting portion 82. The digital camera 90 is mounted on the camera mounting structure 84, with the lens of the digital camera 90 being aligned with a center of the cylindrical shape of the adjusting portion 82.

Figure 5:
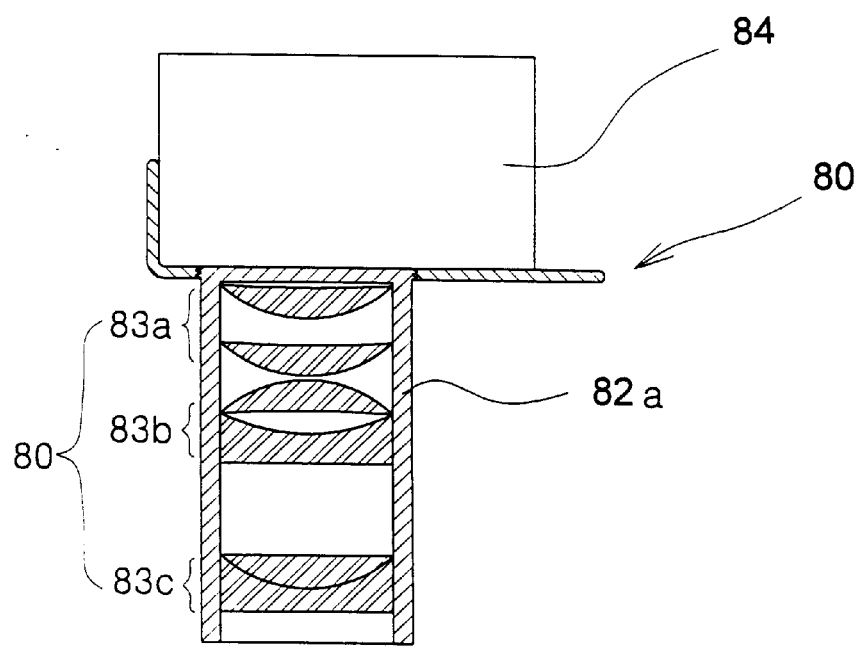
FIG. 5 shows a sectional elevational view of the adapter shown in FIG. 4.

Referring to FIG. 5, there is shown a sectional elevational view of the adapter 80 for connecting the digital camera and the microscope employed in the inventive image processing system.

As shown, the adjusting portion 82 of a cylindrical shape 82a is provided with the magnifying lens 83a for additionally magnifying the image enlarged by the objectives 30, the spherical aberration correcting lens 83b for correcting the spherical aberration caused by the lens contained in the digital camera 90 and the chromatic aberration correcting lens 83c for correcting the chromatic aberration due to the prism effect of a light. All of the lenses within the adjusting portion 82 are of a widen view lens in order to cover a wide view angle of the digital camera 90 and to provide the user with a wider view.

Accordingly, the adapter 80 allows the digital camera 90 to obtain a more precise image of the specimen since the adapter 80 corrects the spherical aberration caused by using the digital camera designed not to permit the removal of the lens contained therein and the chromatic aberration due to the prism effect of a light.

As a preferred embodiment, the magnification obtained by the magnifying lens 83a is equal to that by the eyepieces 40 so that the image taken by the digital camera 90 through the adjusting portion 82 is identical to the image viewed by the user through the eyepieces 40.

Figure 3:
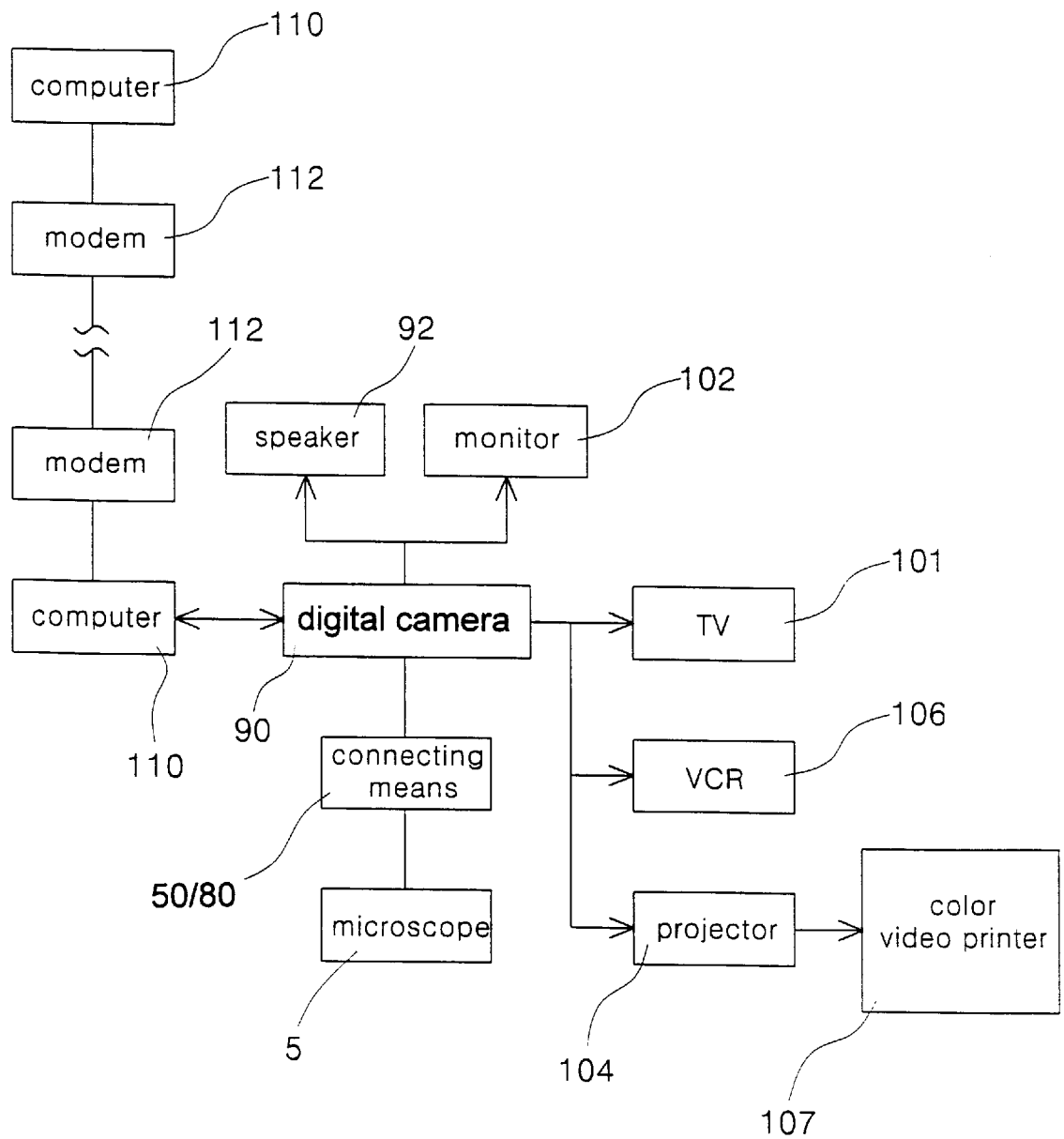
FIG. 3 is a block diagram of the inventive image processing system using a digital camera for use with a microscope.

In FIG. 3, there is shown a block diagram of one example of the inventive image processing system using the digital camera for use with the microscope.

As shown, the image of the sample is taken by the digital camera 90 through the microscope 5 and the adapter 80 to be preserved within the digital camera 90 as an image information. An analog form of the image information from the digital camera 90 is sent to a TV 101, the VCR 106 or the projector 104. An output signal from the projector 104 may be printed by a color video printer 107 or the like.

A digital form of the image information can be processed or edited by the computer system 110 and then is transmitted to another computer system 110 in a remote place through the use of a modem 112 or a LAN card or the like.

A plurality of persons can see the image of the sample displayed on the monitor 102 connected to the digital camera 90, hearing a recorded voice through a speaker 92.

In accordance with the inventive image processing system constructed in this manner, the image of the sample on the microscope 5 is taken by the digital camera 90, being sent to the computer system 110 in the digitalized form so that the image of the sample can be edited or analyzed by the computer system 110. Further, the image of the sample taken by the digital camera 90 is sent to the output device 100, e.g., the monitor 102, the projector 104 or the VCR 106 so that a plurality of persons can see the image of the sample on the microscope 5.

A description of an upper fixing device employed in the inventive image processing system is now made with reference to FIGS. 6 through 10.

Figure 6:
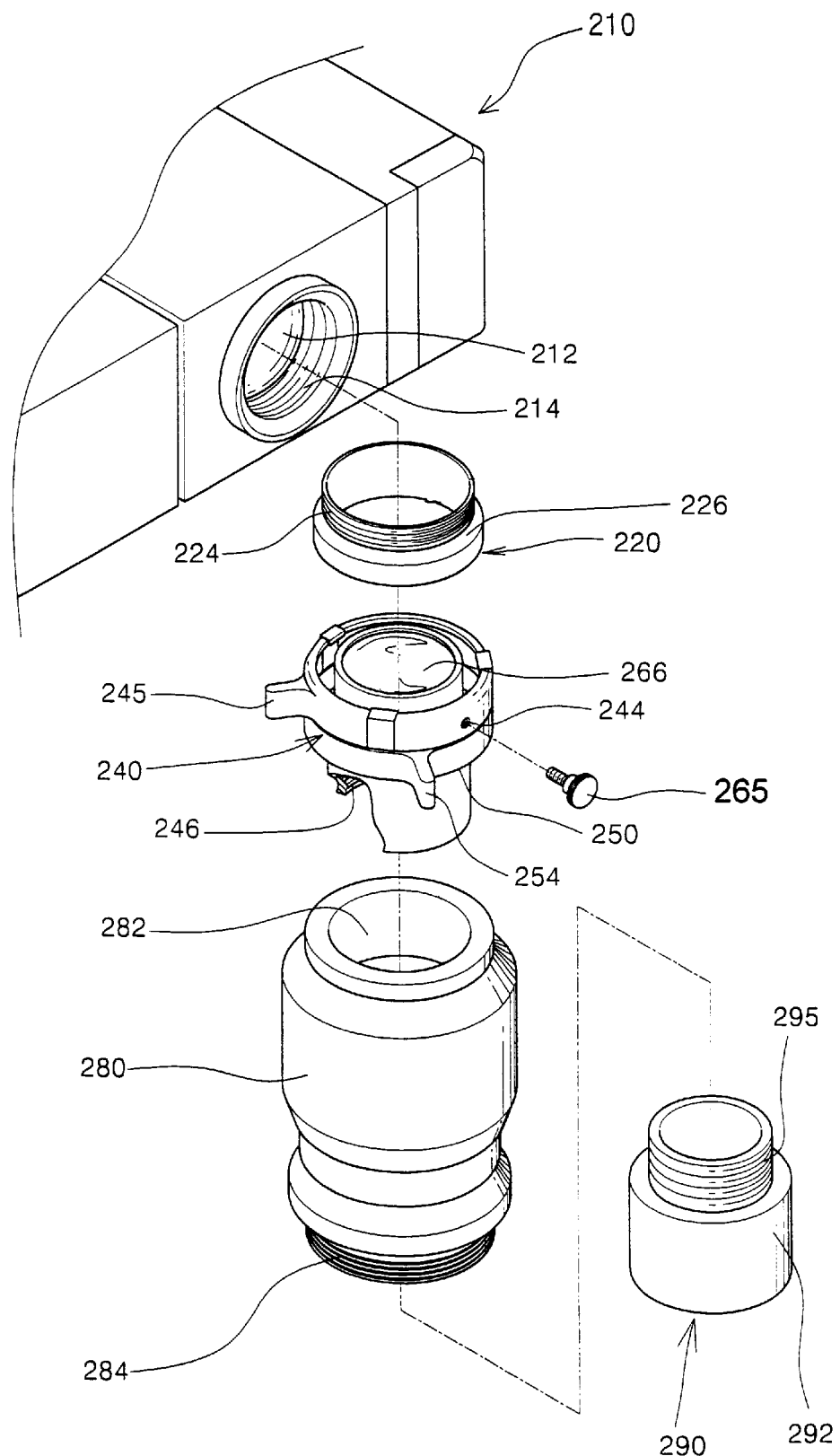
FIG. 6 shows an exploded perspective view of an upper fixing device employed in the inventive image processing system for use with a microscope in accordance with a second embodiment of the present invention.
Figure 7:
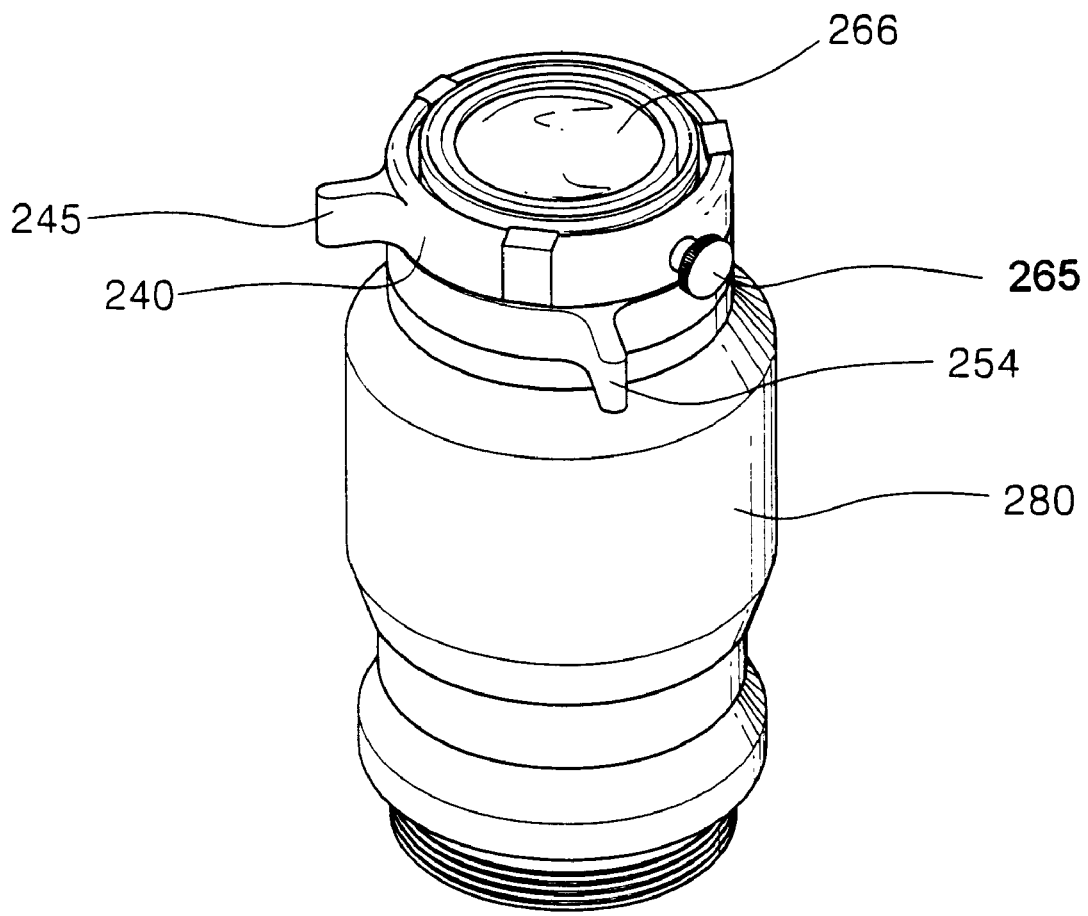
FIG. 7 shows an assembled perspective view of the upper fixing device shown in FIG. 6.
Figure 8:
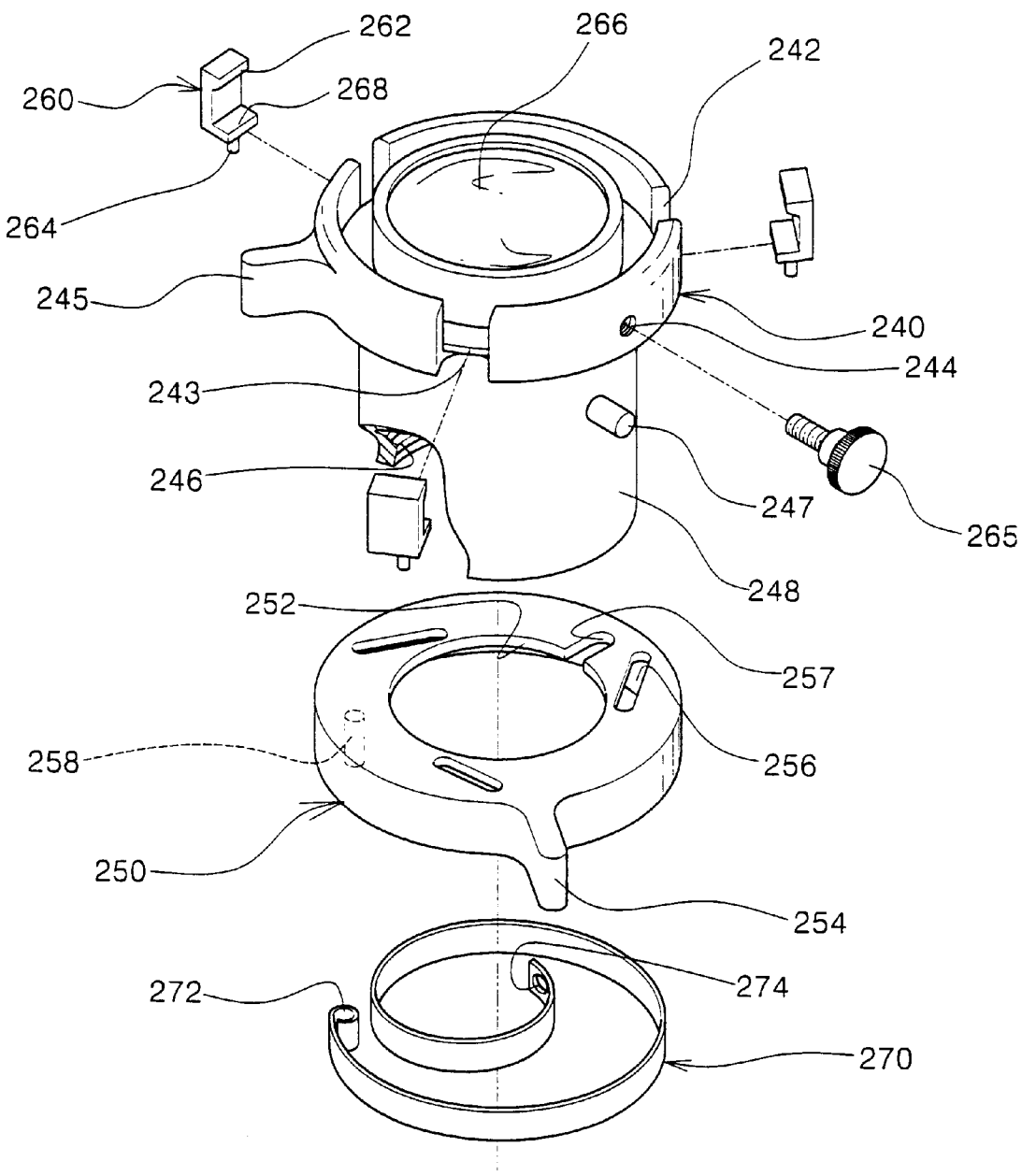
FIG. 8 shows an exploded perspective view of the upper fixing device shown in FIG. 6.

FIGS. 6 to 8 show perspective views of the upper fixing device in an exploded state or an assembled state.

As shown, the upper fixing device comprises a connector 220 engaged with the digital camera 210 via thread, an adapter 240 fixed to the connector 220 by a plurality of hooks 260, upper movable ring 250 combined around the adapter 240 for fixing the adapter 240 to the connector 220, a first cylinder 280 combined with a connecting portion 204 of the microscope via a thread 284 having a first hollow portion 282 surrounding the adapter 240, and a second cylinder 290 combined with a lower portion of the adapter 240 within the first cylinder 280, supporting the adapter 240.

The connector 220 whose dimension will be different depending upon the digital camera to be employed is engaged into a skirt 214 protruding from a surrounding wall surrounding lens 212 of the digital camera 210 via a thread 224. That is, the thread 224 of the connector 220 is engaged with a thread of the skirt 214. The connector 220 has a first contact surface 226 on which a first lug 262 of the hook 260 is contacted. The first contact surface 226 laterally protrudes from the skirt 214 after engagement between them, since a diameter of the first contact surface 226 is larger than that of the skirt 214. The first lug 262 is engaged onto the protruding portion of the first contact surface 226, fixing the adapter 240 to the connector 220.

The adapter 240 has a second contact surface 243 on which a second lug 268 of the hook 260 is contacted. The second lug 268 of the hook 260 has a guiding post 264 protruding vertically downwardly.

The magnifying lens 266 of the adapter 240 is fixed inside an upper portion of the adapter 240, being aligned with the lens of the digital camera 212. Formed on a lower portion of the adapter 240 is a female thread 246 engaged with a male thread 295 formed with an upper portion of the second cylinder 290. The second cylinder 290 functions to fix the first cylinder 280 to the adapter 240. A first handle 245 having a plurality of grooves 242 is formed outside the upper portion of the adapter 240. The second contact surface 243 on which the second lug 268 of the hook 260 is contacted is formed in alignment with the groove 242. Protruding from an external surface of a middle portion of the adapter 240 is a first protuberance 247 for supporting one end of a spiral spring 270.

In order to ensure the engagement between the adapter 240 and the connector 220, a screw hole 244 is formed through the first handle 245 of the adapter 240. A fixing screw 265 is driven into the screw hole 244 to depress an external surface of the connector 220.

In order to allow the adapter 240 to be combinable with the connector 220, regardless of the shape and dimension of the connector to be used, the present invention employs the upper movable ring 250 depressed by the spiral spring 270. The upper movable ring 250 has a plurality of guiding slots 256. The guiding post 264 of the hook 260 is inserted into the guiding slot 256 to slide therewith. Further, the upper movable ring 250 has an open slot 257 which receives the first protuberance 247, and a second protuberance 258 for supporting the other end of the spiral spring 270.

The spiral spring 270 has a first end hole 274 into which the first protuberance 247 is inserted, and a second end hole 272 into which the second protuberance 258 is inserted.

The first cylinder 280 which connects the digital camera 210 and the connecting portion 204 of the microscope, being positioned around the adapter 240 has the first hollow portion 282 surrounding the lower portion of the adapter 240, and the thread portion 284 engaged with the connecting portion 204 of the microscope.

The second cylinder 290 which supports the adapter 240 within the first cylinder 280, being positioned within the first cylinder 280 has the male thread 295 engaged with the female thread 246 of the adapter 240, and a second hollow portion 292 formed with a lower portion of the second cylinder 290 and closely contacted to the first cylinder 280. Assembling the adapter 240 with the upper movable ring 250 and the hooks 260 is described herein below.

First, the lower portion 248 of the adapter 240 is inserted into an inner through hole 252 of the upper movable ring 250. At this operation, the open slot 257 of the upper movable ring 250 is aligned with the first protuberance 247 protruding from a lateral surface of the adapter 240 and then the upper movable ring 250 is moved upwardly, and then the upper movable ring 250 is rotated to break the aligned state between the open slot 257 and the first protuberance 247 in order to prevent the upper movable ring 250 from moving down from the raised position.

Next, the spiral spring 270 is expanded in its radial direction and then the lower portion 248 of the adapter 240 is inserted into the radially expanded spiral spring 270. The first protuberance 247 is inserted into the first end hole 274 of the spiral spring 270 and the second protuberance 258 is inserted into the second end hole 272. At the end of this operation, the upper movable ring 250 is rotationally biased, allowing a second handle 254 to be misaligned from the first handle 245, due to a restoring force by the spiral spring 270.

Next, the hooks 260 are inserted into the plurality of grooves 242, respectively, with the guiding posts 264 protruding from the lower surface of the second lug 268 of the hooks 260 being inserted into the guiding slots 256, respectively. Since the guiding slot 256 of the upper movable ring 250 is slantingly formed with respect to a circumferential direction of the upper movable ring 250, the guiding post 264 of the hook 260 moves inwardly or outwardly in a radial direction depending upon a rotational movement of the upper movable ring 250.

After the upper movable ring 250 and the hooks 260 are combined with the adapter 240 in the manner described above, the digital camera 210 is fixed to the connecting portion 204 of the microscope.

First, the first hollow 282 of the first cylinder 280 is positioned around the lower portion 248 of the adapter 240 and then the second cylinder 290 is engaged with the adapter 240 via the male and the female threads 295 and 246, allowing the first cylinder 280 to be fixed between the adapter 240 and the second cylinder 290. Next, the thread portion 284 of the first cylinder 280 is engaged with the connecting portion 204 of the microscope.

Figure 9:
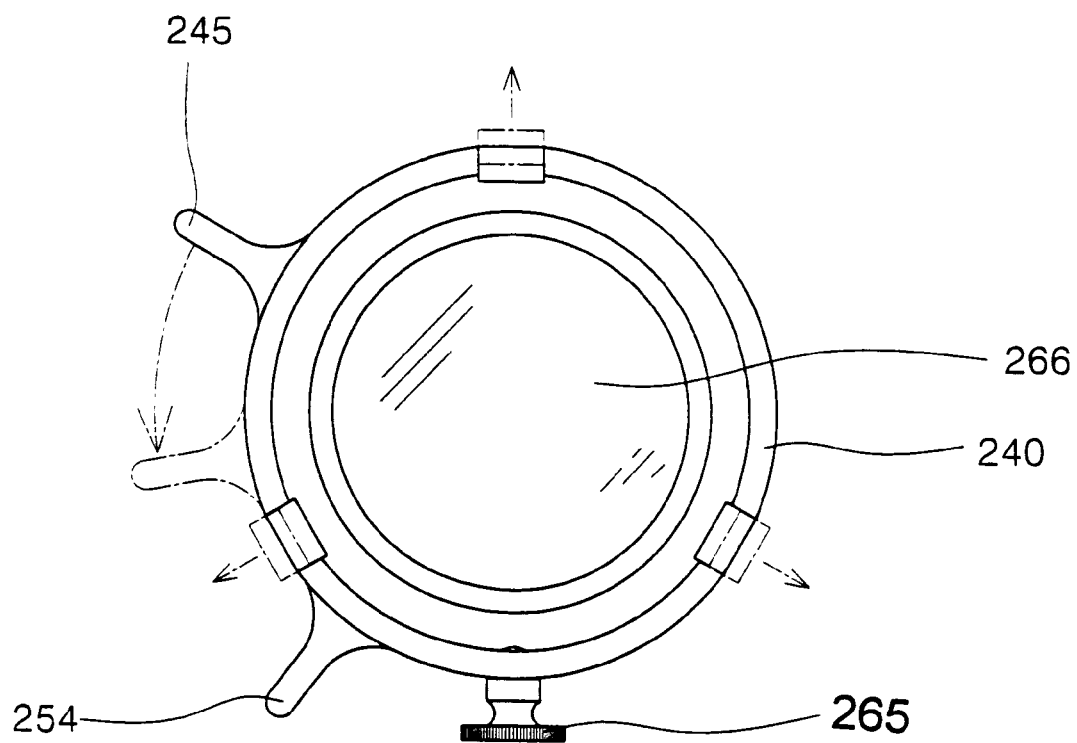
FIG. 9 shows a planar view of the upper fixing device shown in FIG. 6.
Figure 10:
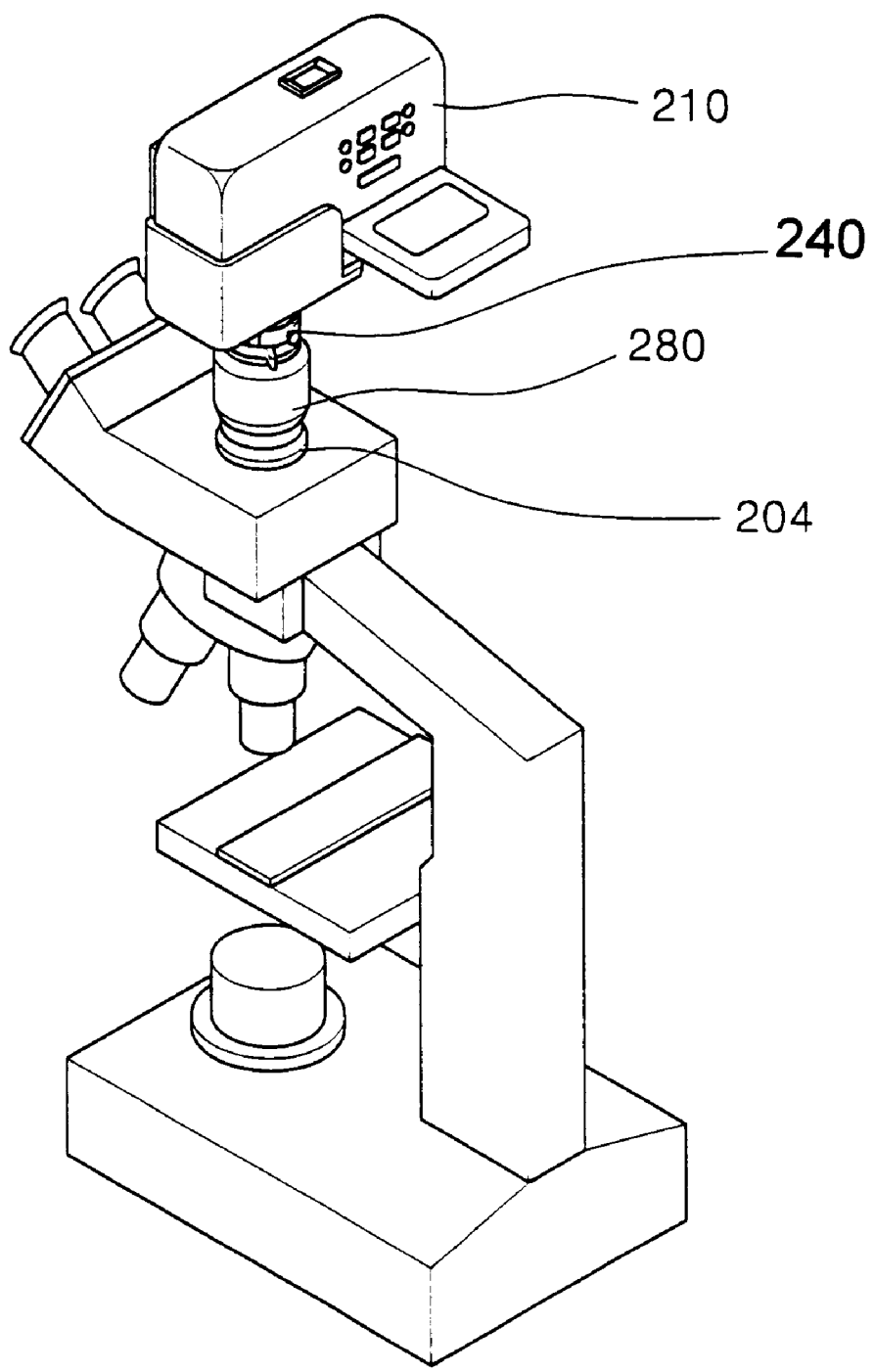
FIG. 10 shows a perspective view of the microscope equipped with the digital camera by using the upper fixing device shown in FIG. 6.

Next, the connector 220 is combined with the skirt 214 of the digital camera 210. As shown in FIG. 9, when the first handle 245 and the second handle 254 are depressed toward each other, the guiding post 264 formed with the hook 260 slides within the guiding slot 256 in response to a rotation of the upper movable ring 250. As a result, the guiding post 264 moves radially outwardly in a horizontal plane of the upper movable ring 250, allowing the hook 260 to move radially outwardly. At this situation, the restoring force of the spiral spring 270 starts to be increased. Next, if the first and the second handles 245 and 254 are released in a situation that the first lug 262 of the retreated hook 260 is arranged on the first contact surface 226 of the connector 220, the restoring force of the spiral spring 270 permits the upper movable ring 250 to rotate in an opposite direction. At the same time, the guiding post 264 moves radially inwardly in the horizontal plane of the upper movable ring 250 by the guide slot 256, allowing the first lug 262 to snap the connector 220 to fix the connector 220 to the adapter 240 and the first cylinder 280.

Fixing the digital camera 210 to the microscope is completed by driving the fixing screw 265 into the screw hole 244 to fix the adapter 240 to the connector 220.

In accordance with the present invention, a lower fixing device may be employed instead of the second cylinder which allows the digital camera to be combinable with various types of microscopes.

A description of the lower fixing device employed in the inventive image processing system is now made with reference to FIGS. 11 through 14.

Figure 11:
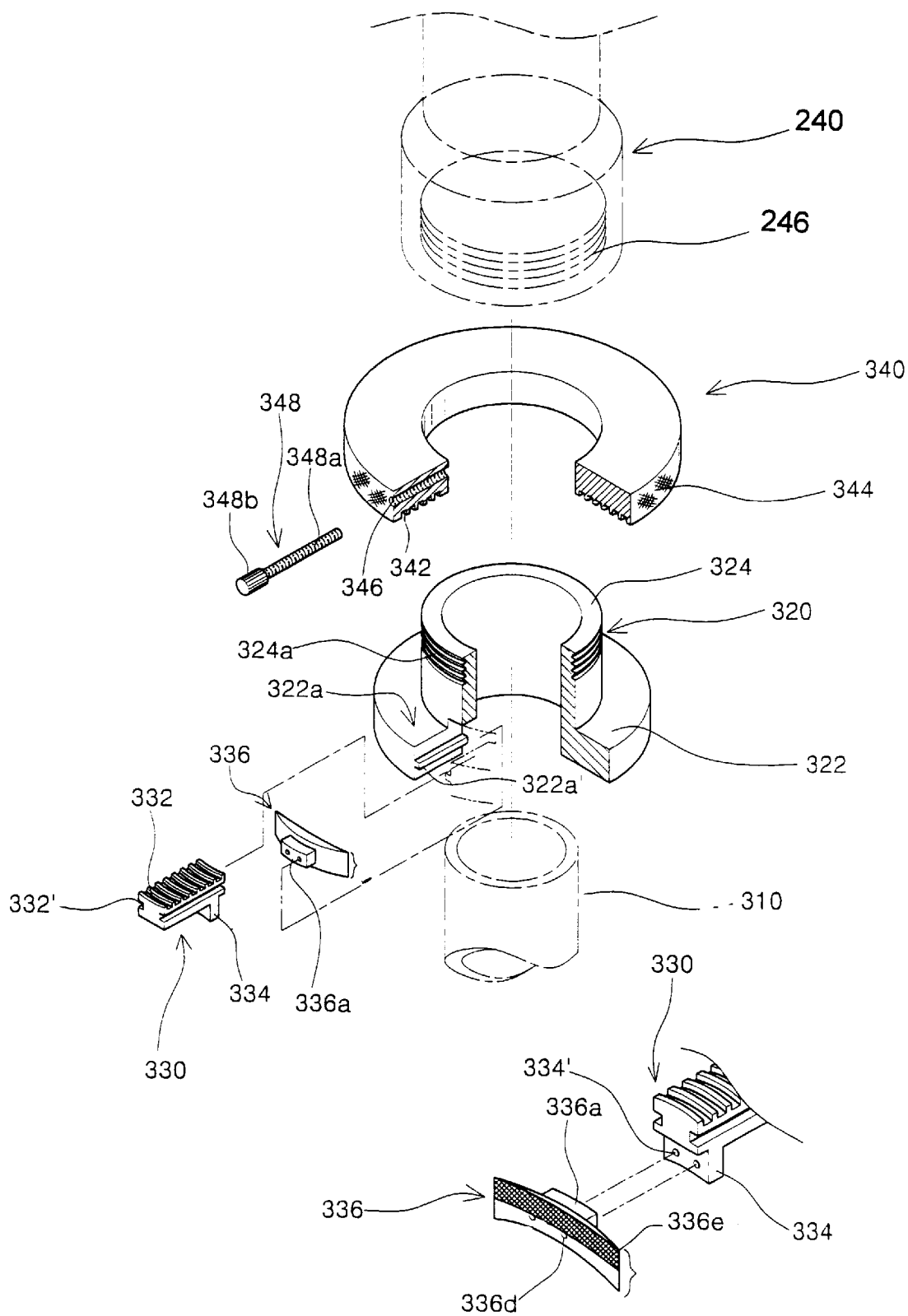
FIG. 11 shows an exploded perspective view of a lower fixing device in accordance with the present invention.
Figure 12:
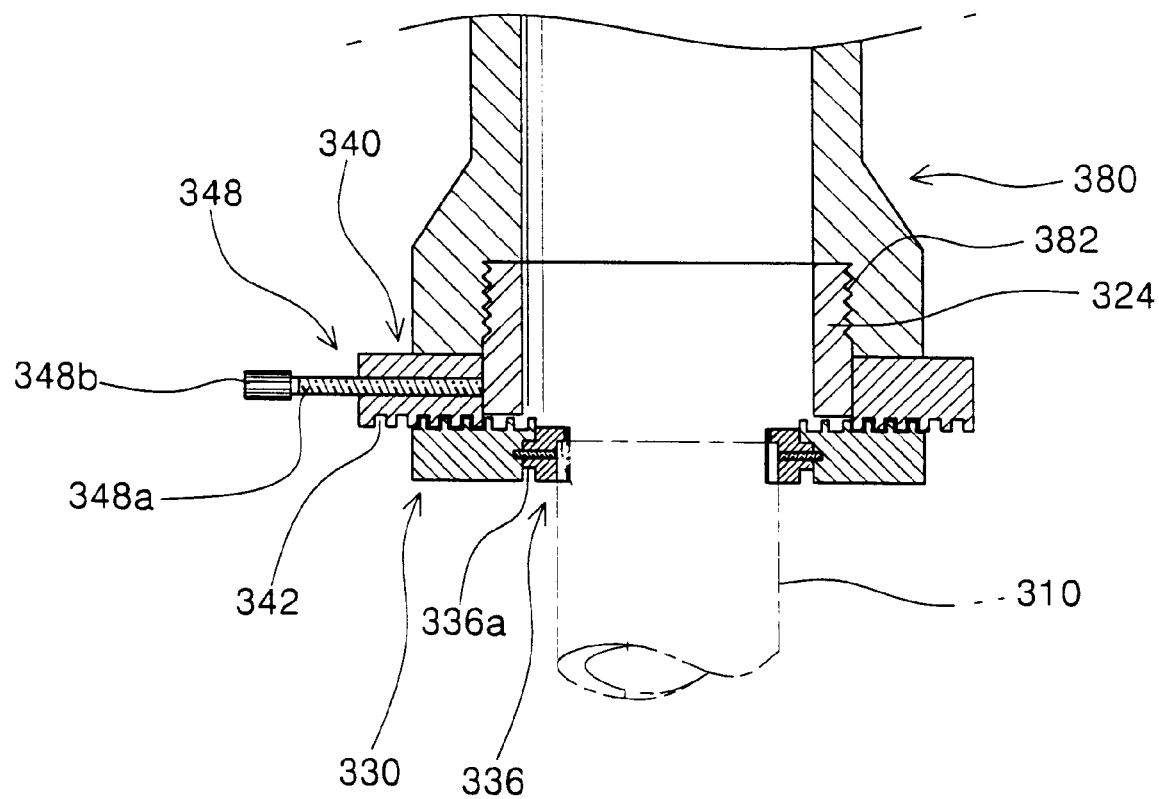
FIG. 12 shows an assembled sectional view of the lower fixing device shown in FIG. 11.
Figure 13:
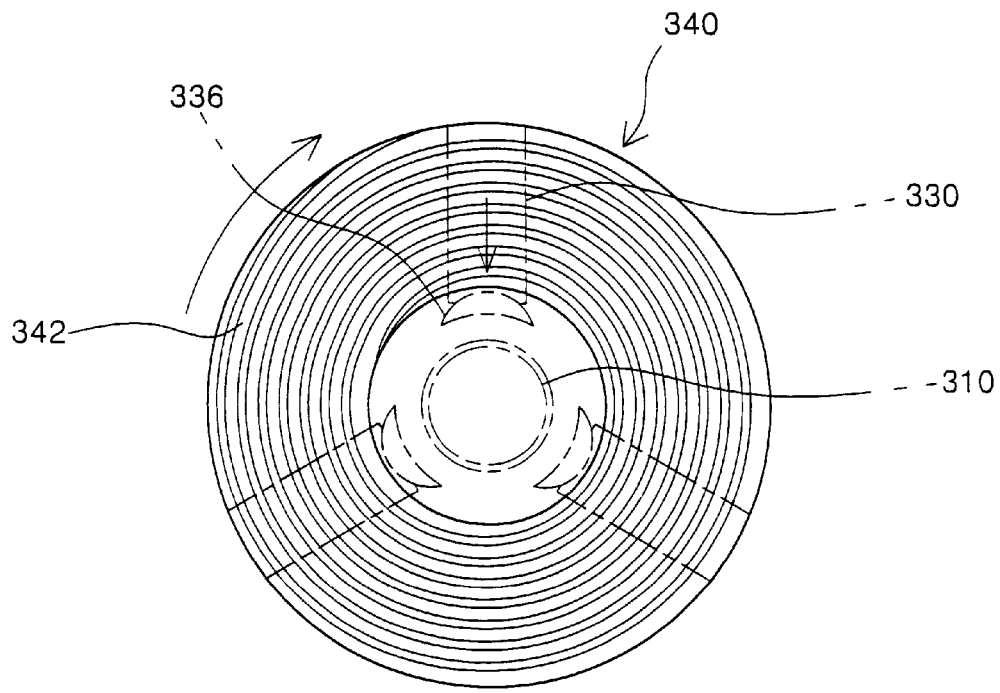
FIGS. 13 and 14 show planar views of operational modes of the lower fixing device employed in the lower fixing device, respectively.
Figure 14:
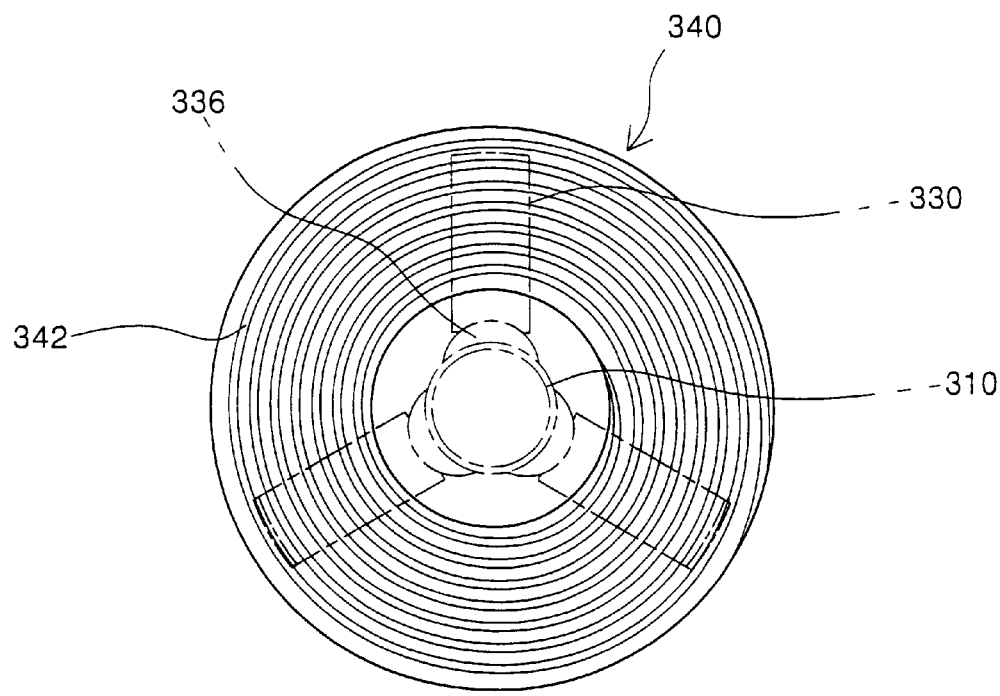

FIG. 11 shows an exploded perspective view of the lower fixing device of the present invention; and FIG. 12 shows an assembled sectional view of the lower fixing device shown in FIG. 11. Further, FIGS. 13 and 14 show planar views of operational modes of the lower movable ring employed in the lower fixing device, respectively.

As shown in FIGS. 11 and 12, the lower fixing device comprises a disk 322 engaged with the female thread 246 of the adapter 240 and having a plurality of guiding cuts 322a which are radially arranged, a plurality of guiding rails 322a' formed on lateral walls of the guiding cuts 322a, a connecting body 320 extending from the disk 322 in an axial direction thereof and having a hollow contact area 324 with a second male thread 324a, a lower movable ring 340 coming into contact with an upper surface of the disk 322 and having a first adjust thread 342 formed on its lower surface, and a plurality of sliders 330 sliding in a radial direction of the disk 322 along the guiding rail 322a' formed on the connecting body 320 constituting the guiding cut 322a in response to a rotation of the lower movable ring 340 and having a second adjust thread 332 on its upper surface which is engaged with the first adjust thread 332 and a guiding groove 332', on its lateral surface, into which the guiding rail 322a' is engaged.

The connecting body 320 is connected to the female thread 246 of the adapter 240 by using the hollow contact area 324 vertically extending from the disk 322 of a doughnut shape. Further, three guiding cuts 322a are formed with the disk 322, being radially arranged on a horizontal plane of the disk 322. The number of the guiding cuts 322a is not limited in the present invention. The pair of guiding rails 322a' are formed on the lateral walls of the guiding cut 322a, respectively, and are engaged with the guiding grooves of the slider 330, respectively, to allow the slider 330 to slide along the guiding rail.

The lower movable ring 340 of a ring shape is positioned around the hollow contact area 324 to be seated on the upper surface of the lower movable ring 340. The disk 322 has a first adjust thread 342 on its lower surface. An external lateral surface of the lower movable ring 340 is knurled in order to prevent a slippage, when the user rotates the lower movable ring 340.

A same number of screw holes 346 as that of the guiding cuts 322a are formed through the lower movable ring 340 along the radial direction of the lower movable ring 340. The lower movable ring 340 can be fixed to the hollow contact area 324 by driving fixing screws 348 into the screw holes 346. The fixing screw 348 has a thread portion 348a inserted into the screw hole 346 and a head 348b for providing the user with convenience in dealing with the fixing screw 348.

Since the slider 330 has the pair of the guiding grooves 332' into which the pair of guiding rails 322a' are engaged, respectively, and the second adjust thread 332 engaged with the first adjust thread 342, the slider 330 reciprocates in the radial direction of the disk 322 in response to the rotation of the lower movable ring 340. The slider also has an extension 334 protruding downwardly therefrom which has a pair of holes 334' so that a protruding portion 336a of an arcuate pad 336 is mounted on the extension 334. A front surface of the arcuate pad 336 connected to the connector 310 of the microscope has a stepped-shape. A pair of through holes 336d corresponding to the holes 334' formed with the extension 334 of the slider 330 are formed through the arcuate pad 336.

In order to absorb a shock occurring when the arcuate pad 336 meets the connector 310 of the microscope, a rubber layer 336e is prepared on the arcuate pad 336. It is preferable that the slider 330 be movable in a range of 15 mm–55 mm.

The digital camera is fixed to the microscope in such a manner that after the digital camera is combined with the adapter by the lower fixing device, the digital camera and the adapter is positioned on the connector 310 of the microscope, maintaining an aligned state of the connector 310 within the sliders 330. At this time, if the connector 310 of the microscope has a stepped-shape, it is desirable that the stepped-shaped of the connector 310 be engaged with the stepped-shape of the arcuate pad 336 to reduce the damage of the lens.

In assembling operation, the lower movable ring 340 is first seated on the upper surface of the disk 322 and then the sliders 330 are combined with the guiding cuts 322a of the connecting body 320 by engaging the guiding grooves 332' with the guiding rails 322a' and by engaging the first adjust thread 342 with the second adjust thread 332. When the lower movable ring 340 is rotated, the slider 330 is moved radially inwardly in a horizontal plane of the disk 322, allowing the arcuate pad 336 to move toward the connector 310 of the microscope, as shown in FIGS. 13 and 14.

A modification of the lower fixing device employed in the present invention is shown in FIGS. 15 to 18.

Figure 15:
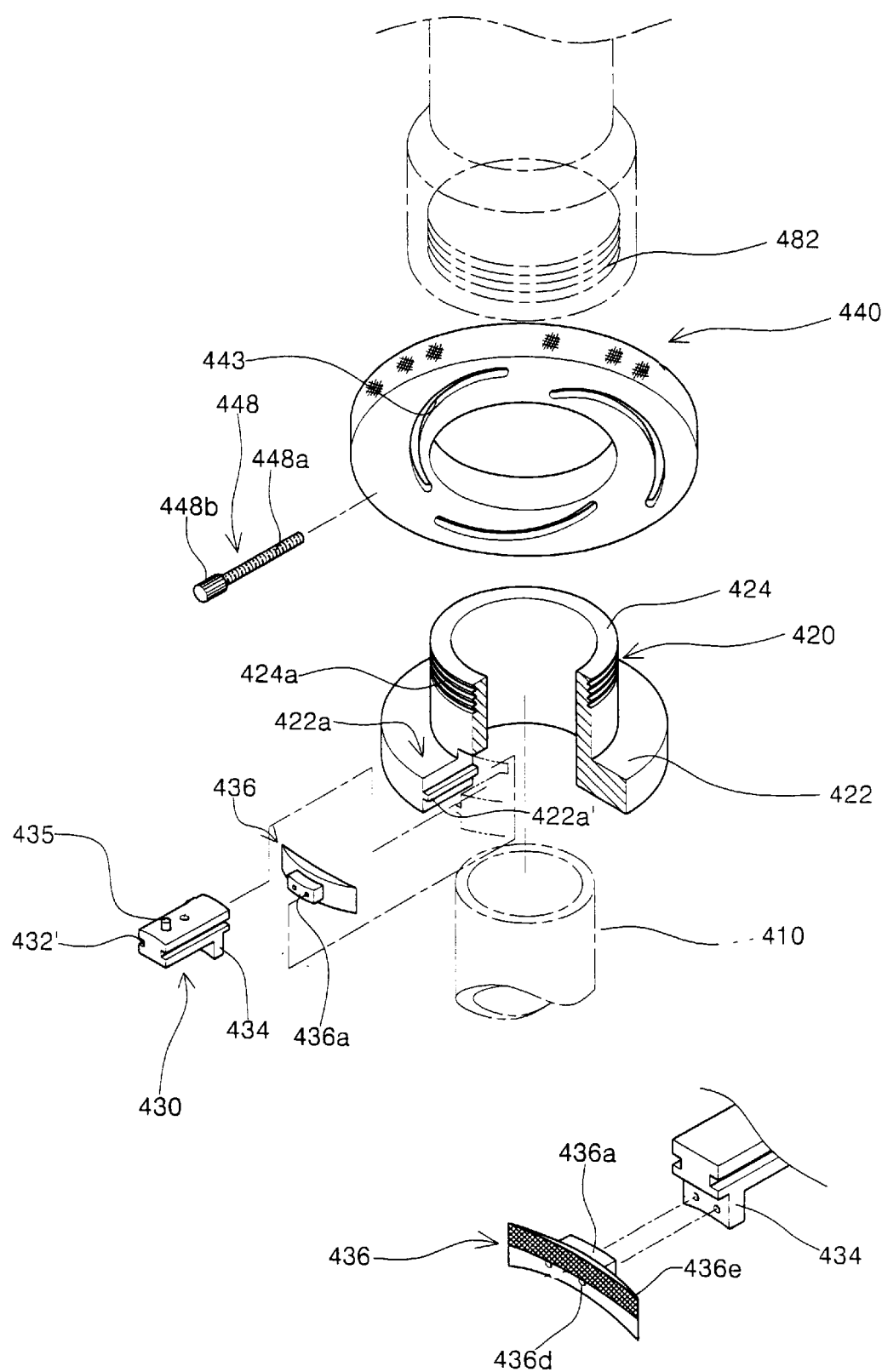
FIG. 15 shows an exploded perspective view of a modification of the lower fixing device in accordance with the present invention.
Figure 16:
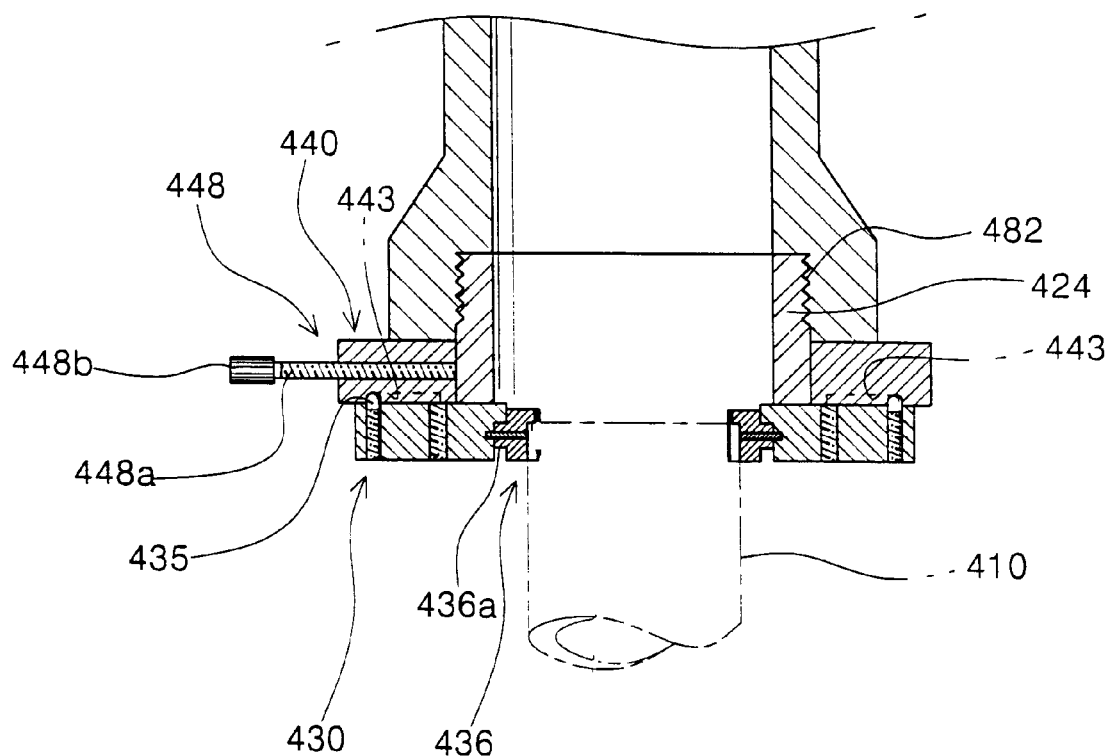
FIG. 16 shows an assembled sectional view of the modification of the lower fixing device shown in FIG. 15.
Figure 17:
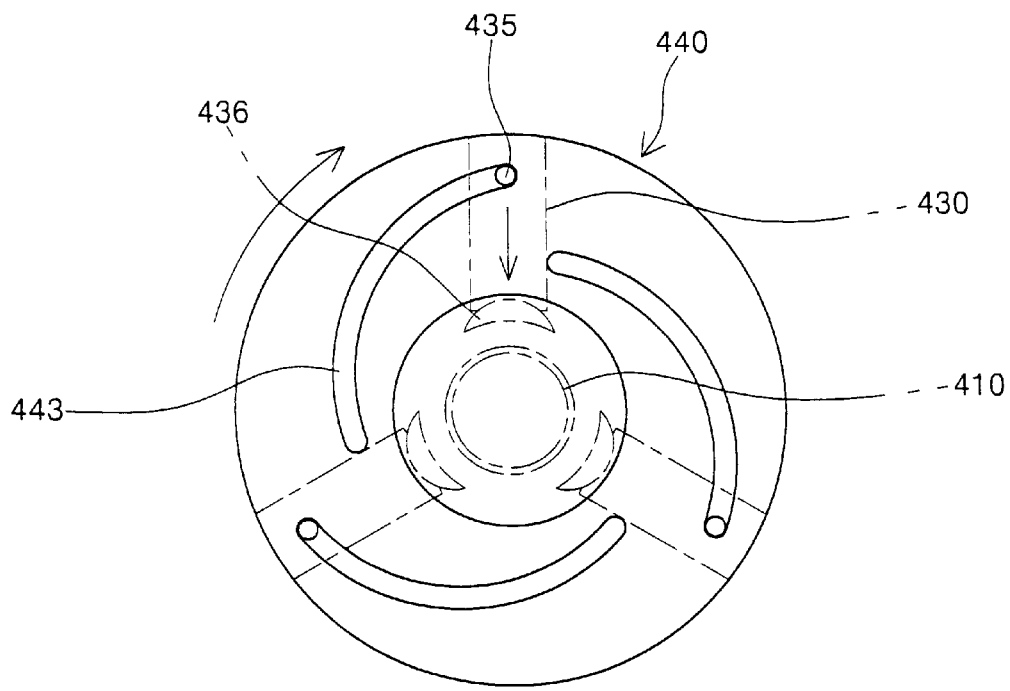
FIGS. 17 and 18 show planar views of operational modes of the modification of the lower fixing device employed in the lower fixing device, respectively.
Figure 18:
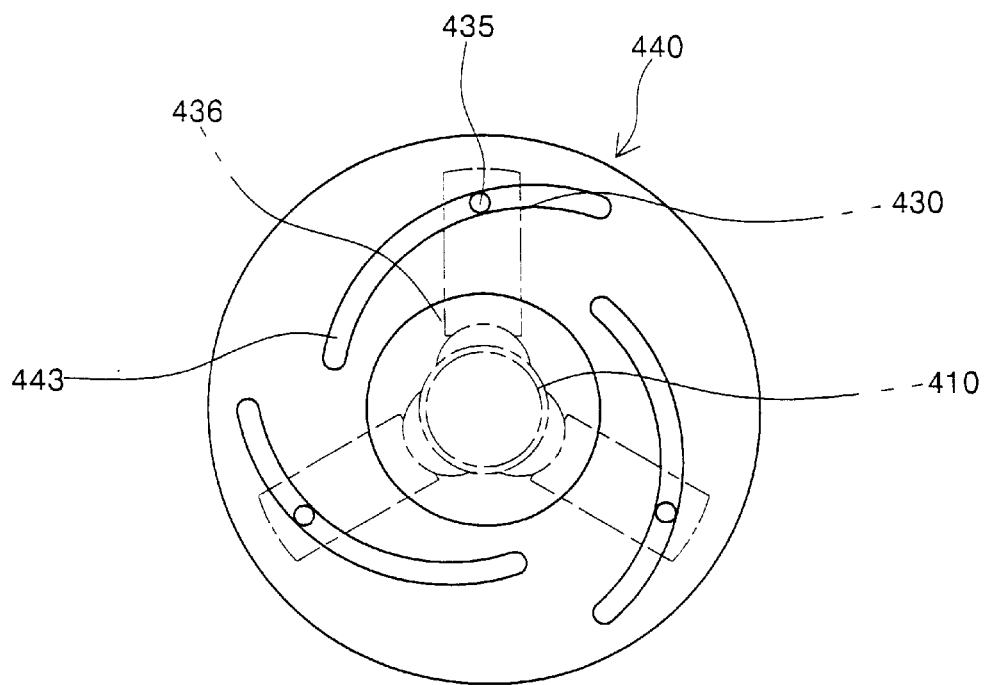

FIG. 15 shows an exploded perspective view of a modification of the lower fixing device in accordance with the present invention; and FIG. 16 shows an assembled sectional view of the modification of the lower fixing device shown in FIG. 15. Further, FIGS. 17 and 18 show planar views of operational modes of the modification of the lower fixing device employed in the lower fixing device, respectively. A general construction of the modification of the lower fixing device is similar to that in the previous embodiment.

In the modification, the lower fixing device comprises a plurality of guiding slots 443 formed on a lower surface of a lower movable ring 440, and a plurality of guiding posts 435 of sliders 430 which are inserted into the guiding slots 443, respectively, instead of the first adjust thread 332 and the second adjust thread 342. Other components not described are similar to those in the previous embodiment; and those components are indicated with reference numerals increased by 100.

Since each of the guiding slots 443 is slantingly formed with the lower movable ring 440, when the lower movable ring 440 is rotated, the guiding post 435 moves in a radial direction of the lower moving ring 440, sliding along and within the guiding slot 443, as shown in FIGS. 17 and 18. As a result, the arcuate pad 436 mounted on the front of the slider 430 can come into contact with the connector 410 of the microscope, allowing the digital camera to be combinable with different types of microscopes in size and shape.

In accordance with the inventive image processing system, an enlarged image of a specimen seen through the microscope is taken by a digital camera to be edited, analyzed or restored by using a computer system.

Further, in accordance with the inventive image processing system, a moving or a static image of a specimen seen through the microscope is taken by a digital camera to be recorded in a cassette tape for a video cassette recorder (VCR).

Further more, in accordance with the inventive image processing system, a moving or a static image of a specimen seen through the microscope is taken by a digital camera be sent to a monitor or a projector to be seen by a plurality of persons at the same time.

In addition, in accordance with the present invention, since the adapter, the upper fixing device and the lower fixing device enable various types of digital camera widely spreaded to be combinable with different types of microscopes, the inventive image processing system has a highly increased compatibility of components and can be easily constructed by using a normal digital camera and the microscope with common use.

Although the invention has been shown and described with respect to the preferred embodiments, it will be understood by those skilled in the art that various changes and modifications may be made without departing from the spirit and scope of the invention as defined in the following claims.

What is claimed is:

1. An image processing system for use with a microscope employing a portable digital camera, wherein the portable digital camera includes a memory card for storing an image observed by the microscope, and transfers the observed image to an external display device, the system comprising:

a frame on which the portable digital camera is seated; and a fixing device for connecting said frame to a connector of the microscope so that the image from the microscope can be taken by the portable digital camera;

wherein the fixing device extends vertically below the frame to the connector, and includes a magnifying lens, a spherical aberration correcting lens, and a chromatic aberration correcting lens which are sequentially arranged from the frame toward the connector, and wherein the magnifying lens magnifies an image enlarged by objectives within a tube of the microscope and comprises a widen view lens which can make a view angle of the image from the objectives widen and has a predetermined magnification such that the image taken by the portable digital camera is equal in magnification to an image viewed through an eyepiece of the microscope, the spherical aberration correcting lens corrects a spherical aberration caused by a lens contained in the portable digital camera and the chromatic aberration correcting lens corrects a chromatic aberration of an image incident on the lens of the portable digital camera that passes through the objectives of the microscope.

2. The image processing system of claim 1, wherein said fixing device is an adapter having a cylindrical shape and having a lower portion connected to the connector of the microscope, said adapter being connected to the portable digital camera by way of said frame, and being aligned with the lens of the portable digital camera such that the lens of the portable digital camera is coaxially aligned with the adapter.

* * * * *